US010404765B2

(12) United States Patent
Bliss et al.

(10) Patent No.: US 10,404,765 B2
(45) Date of Patent: Sep. 3, 2019

(54) RE-HOMING EMBEDDED WEB CONTENT VIA CROSS-IFRAME SIGNALING

(71) Applicant: Microsoft Technology Licensing, LLC, Redmond, WA (US)

(72) Inventors: William James Bliss, Bellevue, WA (US); Siddharth Uppal, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 15/459,957

(22) Filed: Mar. 15, 2017

(65) Prior Publication Data
US 2018/0124131 A1 May 3, 2018

Related U.S. Application Data

(60) Provisional application No. 62/415,971, filed on Nov. 1, 2016.

(51) Int. Cl.
*G06F 3/048* (2013.01)
*H04L 29/06* (2006.01)
*G06F 3/0481* (2013.01)
*G06F 3/0484* (2013.01)
*G06Q 10/10* (2012.01)
*G06F 3/0488* (2013.01)

(52) U.S. Cl.
CPC .......... *H04L 65/403* (2013.01); *G06F 3/0481* (2013.01); *G06F 3/04842* (2013.01); *G06Q 10/10* (2013.01); *G06Q 10/101* (2013.01); *G06Q 10/103* (2013.01); *H04L 65/1033* (2013.01); *G06F 3/0488* (2013.01)

(58) Field of Classification Search
CPC ............... H04L 65/403; H04L 65/1033; G06F 3/04842; G06F 3/0481; G06Q 10/103
See application file for complete search history.

(56) References Cited

U.S. PATENT DOCUMENTS

| 8,677,332 | B1 | | 3/2014 | Hjelmstad et al. |
| 9,106,690 | B1 | | 8/2015 | Banga et al. |
| 9,398,017 | B1 | * | 7/2016 | Nizametdinov ........ H04L 63/10 |
| 9,860,319 | B2 | * | 1/2018 | Chakra ............... G06F 21/6218 |
| 2007/0283352 | A1 | | 12/2007 | Degenhardt et al. |
| 2009/0037806 | A1 | | 2/2009 | Yang et al. |
| 2009/0313304 | A1 | * | 12/2009 | Goodger ........... G06F 17/30896 |

(Continued)

OTHER PUBLICATIONS

Crouch, et al., "Window.postMessage()", https://developer.mozilla.org/en-US/docs/Web/API/Window/postMessage, 2005, 6 pages.

(Continued)

*Primary Examiner* — Thanh T Vu
(74) *Attorney, Agent, or Firm* — Schwegman Lundberg & Woessner, P.A.

(57) ABSTRACT

Aspects of the present disclosure relate to providing a cross-iframe solution for instructing embedded content to reuse current in-browser app instances but to load different content. In this manner, a new in-browser app instance does not have to be loaded each time a context switch is performed. More specifically, cross-iframe communications are used to instruct an existing in-browser app instance to load new content such as, for example, a new embedded document.

19 Claims, 14 Drawing Sheets

(56) References Cited

U.S. PATENT DOCUMENTS

| | | |
|---|---|---|
| 2009/0328063 A1 | 12/2009 | Corvera et al. |
| 2010/0049792 A1 | 2/2010 | Hao et al. |
| 2011/0264686 A1* | 10/2011 | Cavagnari .............. G06Q 10/10 707/769 |
| 2013/0031462 A1 | 1/2013 | Calvo et al. |
| 2013/0191880 A1* | 7/2013 | Conlan .................. H04L 63/20 726/1 |
| 2013/0326474 A1 | 12/2013 | Lane |
| 2014/0019589 A1 | 1/2014 | Ross et al. |
| 2014/0189049 A1 | 7/2014 | Volchok |
| 2016/0103803 A1 | 4/2016 | Lam |
| 2016/0266755 A1 | 9/2016 | Casalaina et al. |
| 2018/0011627 A1* | 1/2018 | Siracusano, Jr. ... H04L 65/4015 |

OTHER PUBLICATIONS

"International Search Report and Written Opinion Issued in PCT Application No. PCT/US2017/058646", dated Jan. 18, 2018, 12 Pages.

* cited by examiner

RE-HOMING EMBEDDED WEB CONTENT VIA CROSS-IFRAME SIGNALING

CROSS-REFERENCE TO RELATED APPLICATIONS

This application claims the benefit of and claims priority to U.S. Provisional Patent Application No. 62/415,971, filed Nov. 1, 2016 and entitled "RE-HOMING EMBEDDED WEB CONTENT VIA CROSS-IFRAME SIGNALING," the disclosure of which is hereby incorporated by reference herein in its entirety.

BACKGROUND

In current collaborative workspace environments, there is no notion of allowing a user to seamlessly switch between different tasks in various groups the user may be associated with. For example, if a user is involved with multiple groups, the collaborative workspace environment has a single portal page that is directed to that group. If the user wants to switch to another group, the user typically has to close the portal page and open a new portal page that is associated with the new group.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for enabling a user to seamlessly switch between different workspaces, groups and/or conversations is a collaborative workspace environment. More specifically, the present disclosure describes re-homing embedded web content via cross-iframe signaling. The canvases have a workspace in which content, or an entity, specific to the canvas is displayed. The canvases are contextual in that they change based on the particular context, workspace or group the user is currently accessing.

In examples, iframes are leveraged to display content or entities within different canvases. When a user switches between canvases, content from or associated with the newly selected canvas may be displayed. In examples provide herein, re-homing is employed to display new content upon switching canvases. In examples, a cross-iframe solution is employed in which a signal is sent to a child iframe that instructs the child iframe to load new content.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 5 illustrates the example user interface of FIG. 2 in which a new conversation thread has been added to the user interface when the new canvas of FIG. 4 was added.

DETAILED DESCRIPTION

Figure 1:
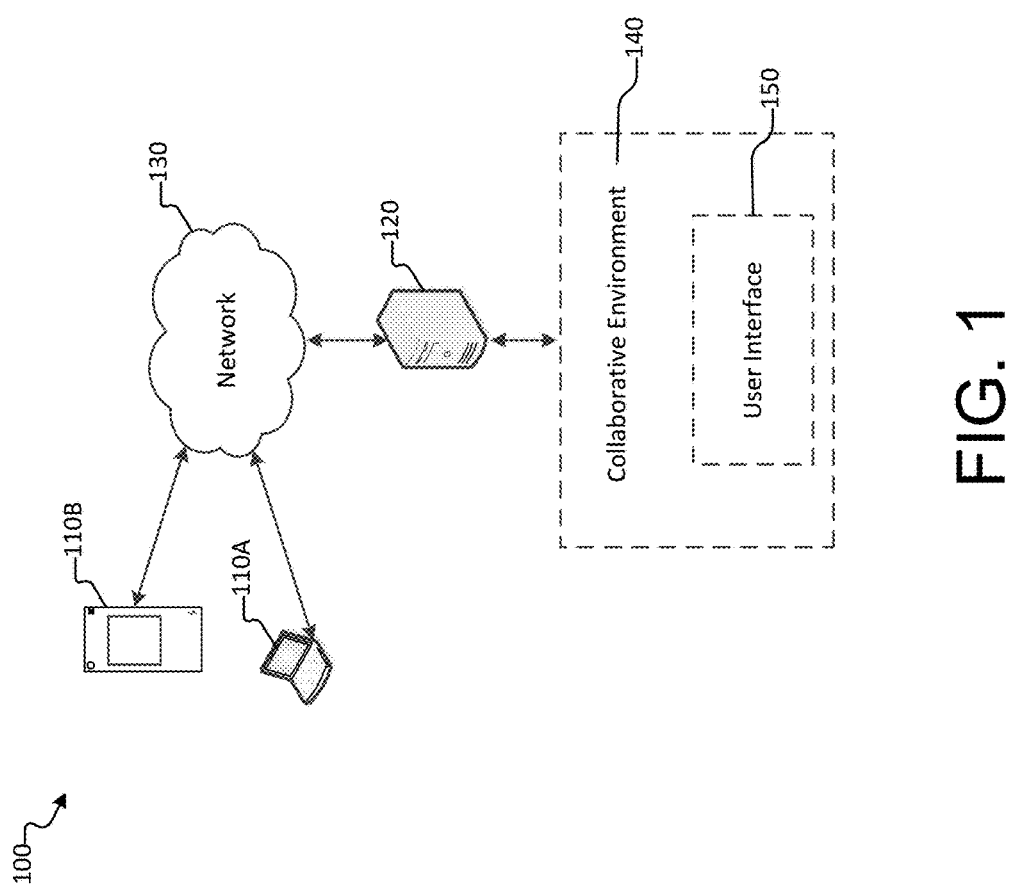
FIG. 1 illustrates an example system for providing a collaborative workspace environment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The disclosure generally relates to a user interface for a collaborative workspace environment. In general, the collaborative workspace environment displays and otherwise provides a user access to multiple groups in the collaborative workspace environment that the user is associated with. Each group may have one or more contexts and each context has a workspace in which content may be displayed and/or shared with other members of the group. As used herein, a context may refer to a tenant in a multi-tenant environment, a team, a channel, a topic, etc. Additionally, as used herein, the term entity means an item within or otherwise provided by service. The entity may be a document, a task, a board and other such content provided by a service. Further, the term entity and content may be used interchangeably. The term service may be any product that provides content. For example, a product may be a word processing application, a workflow management application and so on. The service may be a third party service or a local service that the collaborative workspace environment has access to. Once an entity is provided in the workspace, each member of the group or users that access the context, may access, edit, comment, post or otherwise interact with the entity.

The user interface includes contextual canvases that are associated with each context. Canvases in each of the contexts may be added, removed and edited. When a canvas is selected, a workspace associated with the canvas is provided on the user interface. The workspace may be configured to occupy a majority of the user interface, a portion of the user interface, or the entire user interface. In some instances, the workspace may be resizable based on user selection. The workspace also displays an entity that is associated with the particular canvas. For example, in some instances, an entity (e.g., documents, dashboards, conversations or chats, video content, pictures and so on) may be filtered for each canvas. Thus, each workspace, and the entity displayed in that workspace, is unique to that canvas. For example, the entity that is displayed when one canvas is selected is different than the entity that is displayed when a second canvas is selected.

The entity, as well as a state of the entity, that is provided in each canvas is persistent. For example, the context (e.g., a channel) may be configured to store the state of the canvas. Thus, when input is received to switch between canvases (or open or otherwise access the collaborative workspace environment), the states are loaded/unloaded by the context.

In examples, iframes may be used to embed an entity within a canvas. However, the challenge with iframes is that they execute in their own sandboxed runtime. As a result, performance issues may arise when switching between different contexts. Typically, a document object model (DOM) update clears the iframe and forces a reload of the entire document. As a result, complex single-page web applications can take several seconds to reload every time a context switch is performed. This may result because an object within the iframe that is hosting the entity (e.g., a host object), such as, for example, an application or process, must be reloaded in order to display new content in response to a context switch. To increase performance, aspects of the present disclosure relate to re-homing content (e.g., an entity), such as an embedded document, whenever a context switch is performed. Among other benefits, the aspects disclosed herein provide increased application performance, enhanced user experience, and load time optimization.

Aspects of the present disclosure relate to providing a cross-iframe solution for instructing embedded content to reuse current in-browser app instances but to load different content. In this manner, a new in-browser app instance does not have to be loaded each time a context switch is performed. More specifically, cross-iframe communications are used to instruct an existing in-browser app instance to load new content such as, for example, a new embedded document.

FIG. 1 illustrates an example system 100 for providing a providing a collaborative workspace environment 140 according to an embodiment. In aspects, a client device, such as for example, client device 110A and client device 110B may access a network 130, or other internet connection, and access the collaborative workspace environment 140 executing on a server computing device 120.

In some embodiments, the client computing device 110 is a personal or handheld computer having both input elements and output elements. For example, the client computing device 110 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list is for example purposes only and should not be considered as limiting. Any suitable client computing device for executing a messaging application may be utilized.

The system 100 is a communication system/service that provides the collaborative workspace environment 140 for users to communicate and collaborate over the network 130. In an example, the collaborative workspace environment 140 provides a configurable and extensible workspace for collaboration between users through a user interface 150 that may comprise a plurality of different views.

Users of the collaborative workspace environment 140 may include, but are not limited to: one or more persons, companies, organizations, departments, virtual teams, ad-hoc groups, vendors, customers, third-parties, etc. The collaborative workspace environment 140 enables visibility and communication between users including users who are organized in teams or groups as well as users/groups outside of a team/group.

More specifically, when a user accesses the collaborative workspace environment 140, the user may have access to one or more groups. Each group may be associated with various contexts that have a particular set of content. One or more canvases are associated with each context and each canvas has an associated workspace in which content, related to or otherwise filtered for the canvas and/or context is displayed. By selecting the various canvases that are displayed, different content, associated with each canvas, is provided in the workspace.

In some instances, each canvas may be used to provide content that multiple users may access, edit, and/or create. The content may be provided by various services—both local services (e.g., services, applications and products provided or otherwise hosted by the server 120) and external or third party services. As used herein, a service may be an application, product, or object capable of hosting content. Example services include, but are not limited to, word processing applications or services, spreadsheet applications or services, line-of-business (LOB) management services, customer relationship management (CRM) services, debugging services, accounting services, payroll services and so on. In other examples, the content associate with each canvas may include content from websites and/or applications, such as social media or networking websites, photo sharing websites, video and music streaming websites, messaging applications, search engine websites, sports, news or entertainment websites, and the like.

In some instances, these services may provide robust reporting, analytics, data compilation and/or storage service, etc., whereas other services may provide search engines or other access to data and information, images, videos, document processing and the like.

Figure 2:
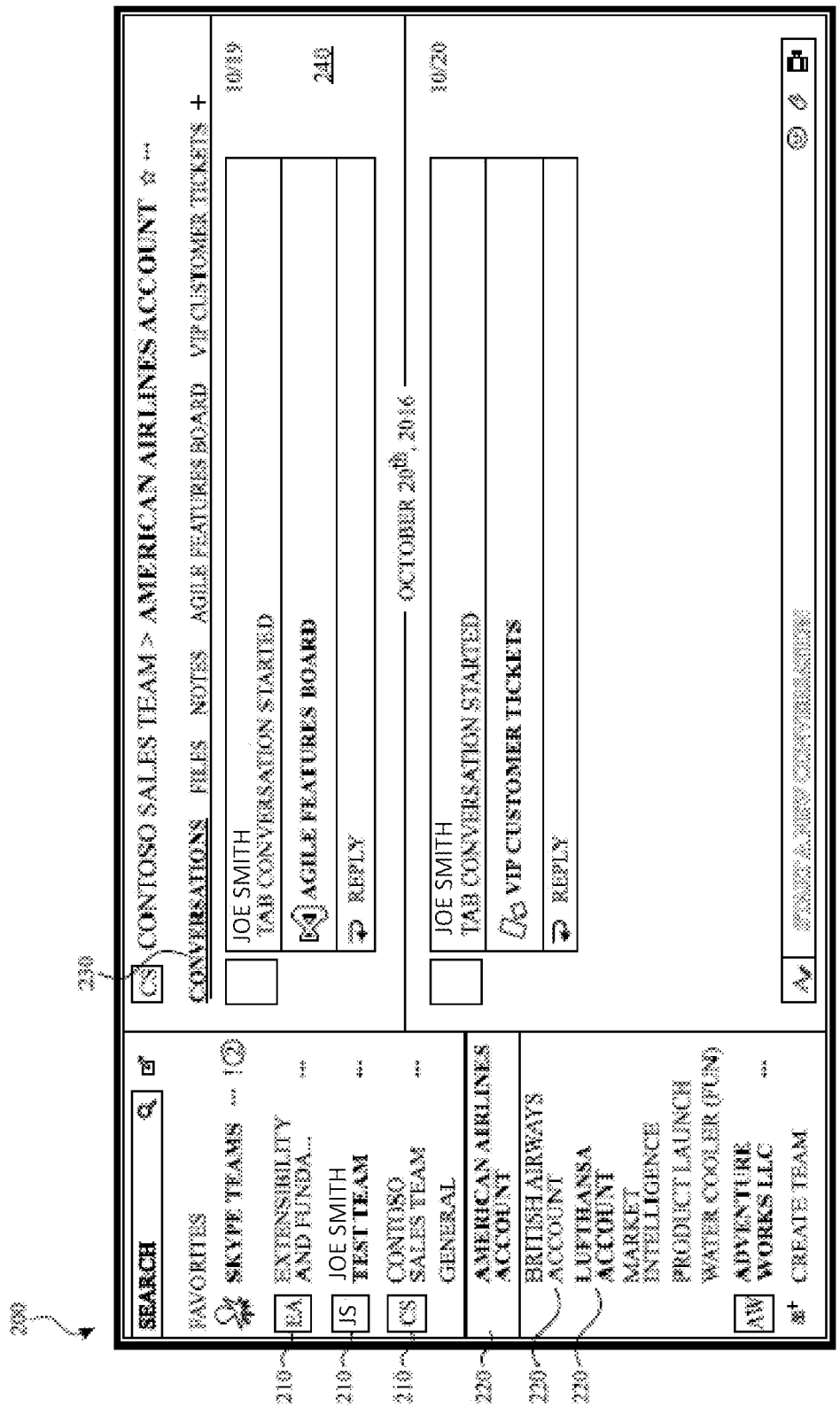
FIG. 2 illustrates an example user interface having various contexts and selectable canvases.

FIG. 2 illustrates an example user interface 200 of a collaborative work environment (e.g., the collaborative work environment 140 of FIG. 1) of the present disclosure. The user interface 200 may be similar to the user interface 150 described above in FIG. 1.

In aspects, the user interface 200 shows various groups 210. Each group may be associated with multiple member or users. In addition, each group 210 may include one or more contexts 220. For example, the "Contoso sale team group" includes an "American Airlines account" context, a "British Airways account" context, a "Lufthansa account" context, a "Market Intelligence" context, a "Product Launch" context and a "Water Cooler (fun)" context. Each of the groups and contexts shown are for example purposes only.

Once a particular context 220 is selected, various canvases 230 associated with the context 220 are provided in the user interface 200. The canvases are used to display content that has been selected, created or filtered for each canvas.

In this example, the canvases of the Contoso sale team context 220 include a "Conversations" canvas, a "Files" canvas, a "Notes" canvas, an "Agile Features Board" canvas and a "VIP Customer Tickets" canvas. Each canvas 230 is associated with a workspace 240 that provides or otherwise displays content. In some instances, the workspace 240 occupies a majority of the user interface 200 to enable the users to have a better view of the content in each canvas. In other instances, the workspace 240 may be sizable by a user. In yet another implementation, the user interface may be divided into multiple workspaces 240 that each associated with different canvases 230 so the user can view content in two different canvases simultaneously.

As discussed above, content that is displayed in each workspace 240 is filtered or otherwise related to a particular canvas 230. For example, the Conversations canvas enables one or more users to start and conduct conversations or chat sessions about content that is associated with the context and/or the various canvases associated with the context. In this case, the conversations include a conversation about the VIP Customer Tickets canvas and the Agile Features Board canvas.

The user interface 200 enables users to seamlessly switch between the canvases 230 and access different content that is displayed in the workspace 240 associated with each canvas. Switching between the canvases 230 does not require that the user close documents, end conversations and so on. A user simply has to select a different canvas 230 in the user interface 200 and the associated workspace 240 and its content, is provided to the user.

Figure 3:
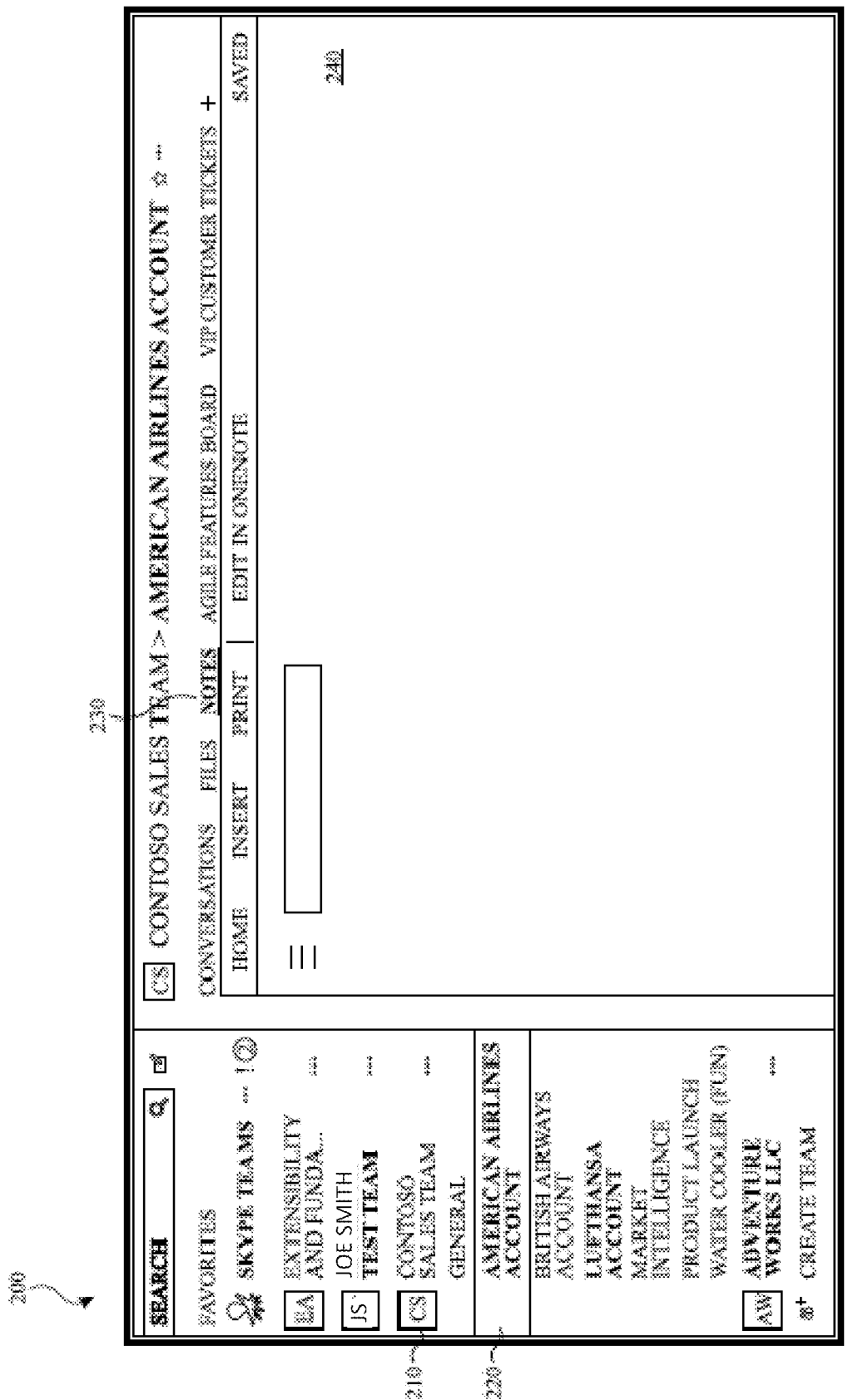
FIG. 3 illustrates the example user interface of FIG. 2 when a different canvas has been selected.

For example, FIG. 3 shows the user interface 200 when a different canvas 230 has been selected. In this example, the "Notes" canvas has been selected. As shown, the Notes canvas has a different workspace 240 with different content than the Conversations canvas.

Figure 4:
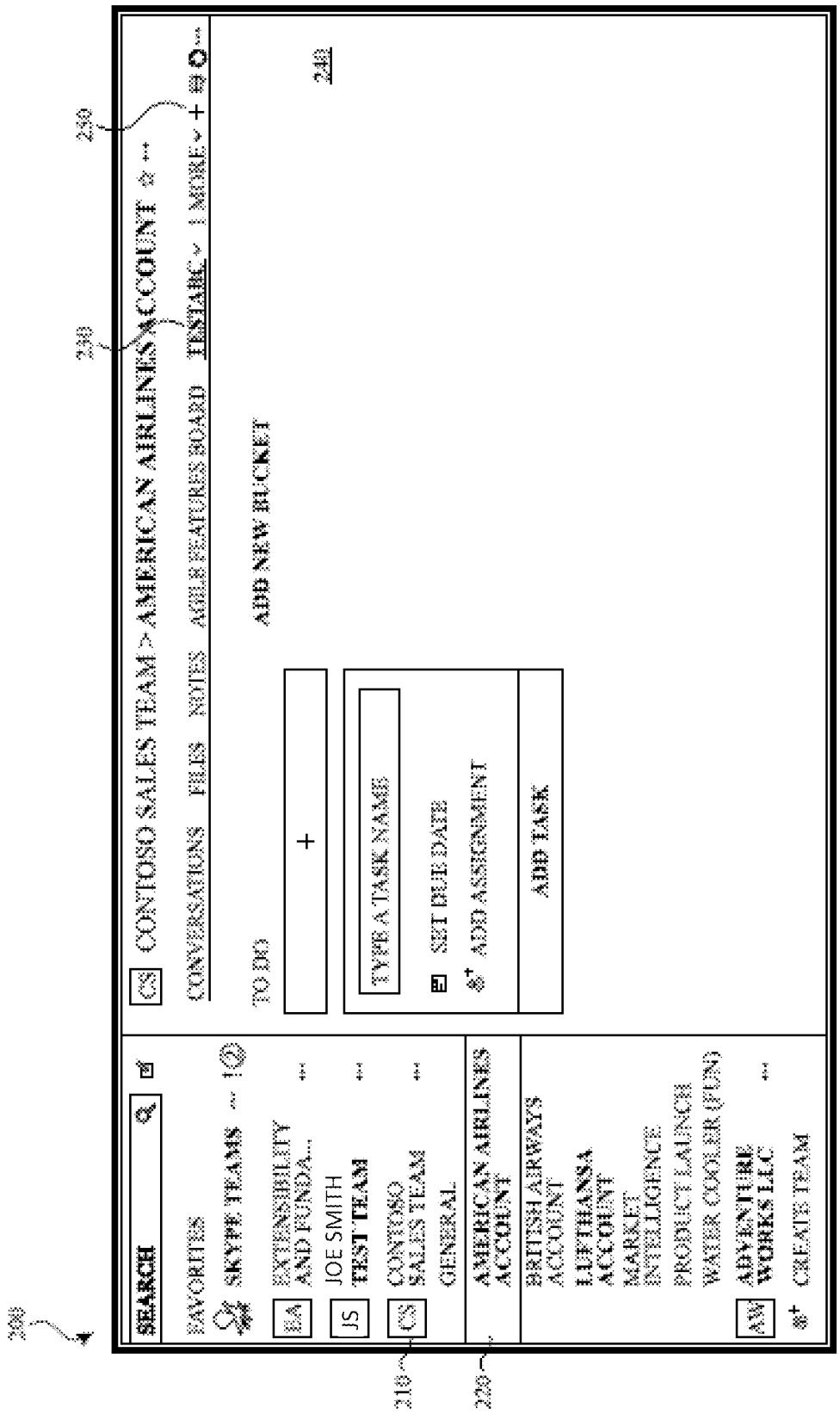
FIG. 4 illustrates the example user interface of FIG. 2 in which a new canvas has been added to the user interface.
Figure 3:
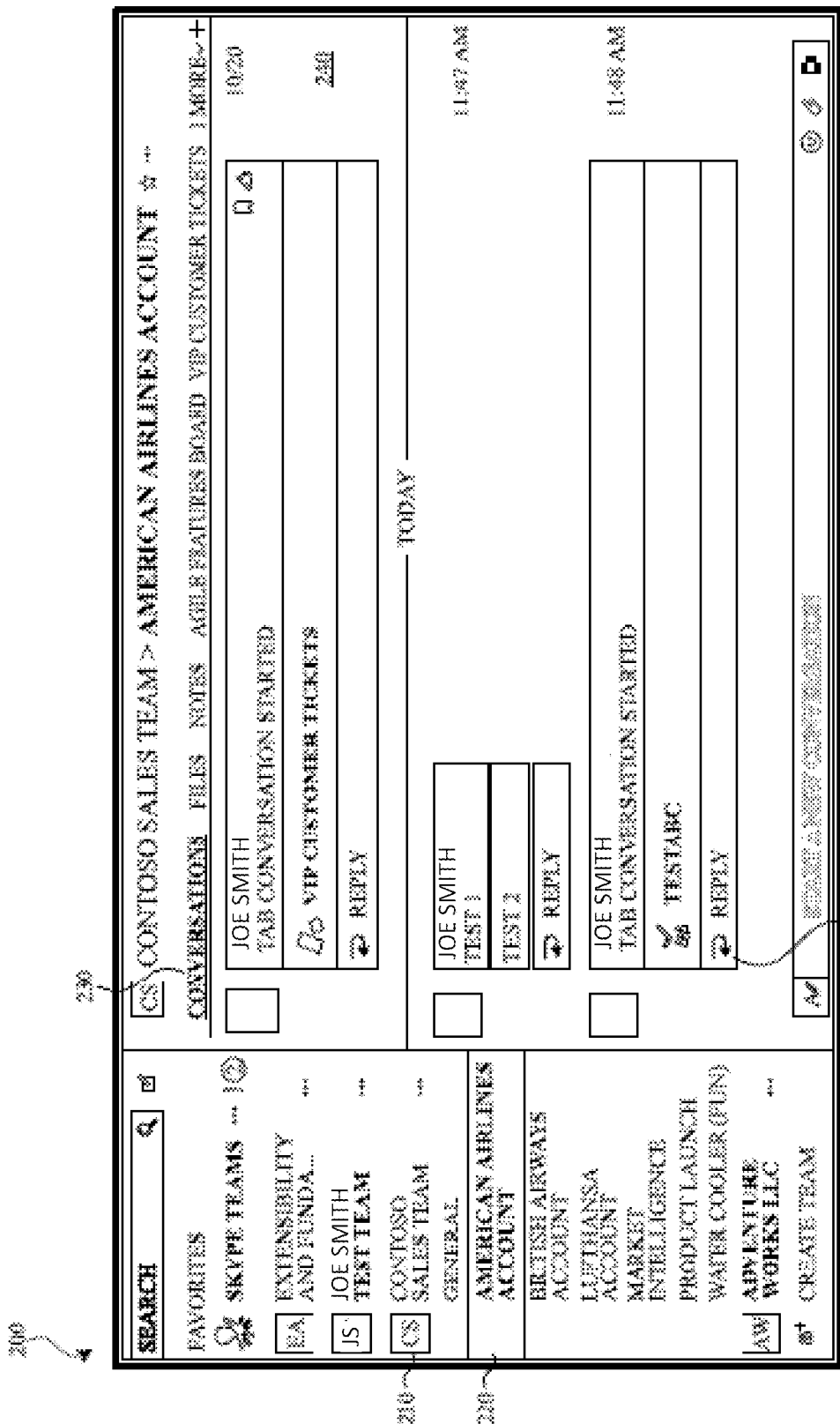

In aspects, a user may provide input to the user interface 200 to create a new canvas. For example, a turning to FIG. 4, the user may provide input to create a new canvas by selecting the "+" icon 250. Once created, the canvas 230 may include customized content.

In this example, the user has created a "testabc" canvas. The content that is associated with this canvas 230 and displayed in the workspace 240 is content that corresponds to various tasks. Although tasks are specifically shown, other content may be provided in each canvas 230.

Once the new canvas 230 has been added, a corresponding conversation or chat session may be initialized in the Conversations canvas 230. For example, and turning to FIG. 5, a "testabc" conversation 260 is now provided in the workspace 240 of the Conversations canvas. Using this conversation, multiple users can discuss, or provide comments about the content hosted in the each of the "testabc" canvas (as well as content that is provided in each of the other canvases 230 of the context 220).

Figure 6:
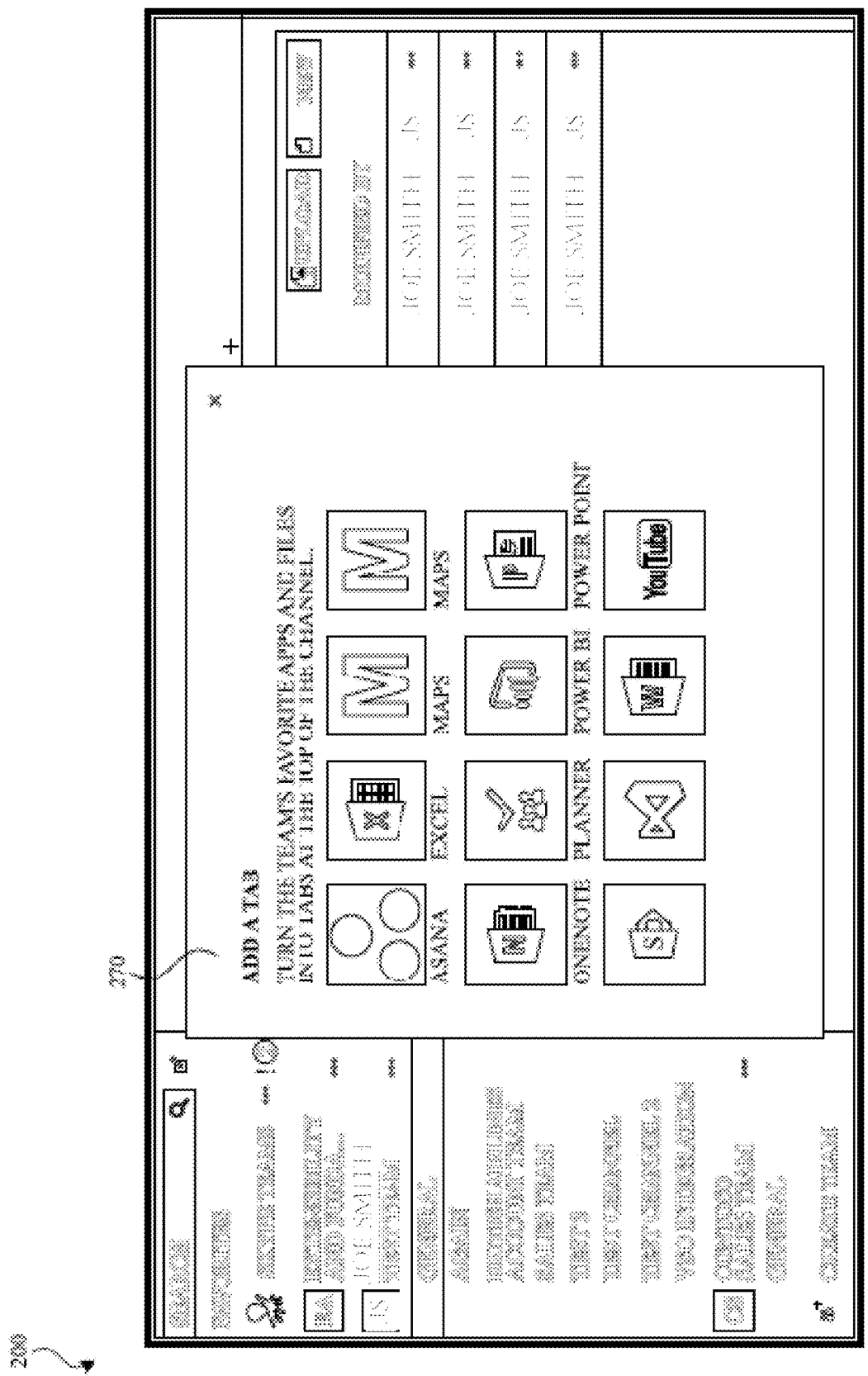
FIG. 6 illustrates how a service may be used to create a canvas in the user interface.

FIG. 6 illustrates an example user interface 200 that enables creation of a new canvas. In this example, when a user provides input to add a canvas, a content selection screen 270 is provided in the user interface 200. The content selection screen 270 enables a user to select one or more services from which content may be added. The service may a third party or external service (e.g., video content website) or may be a local service (e.g., a word processing application) hosted by a server computing device or stored locally on a client device on which the user interface 200 is provided.

In some embodiments, a canvas may be created or added by selecting content that is stored locally on the client device or stored in the cloud. Once the content is selected, a new canvas may be automatically generated and the content may be provided in the workspace 240. In other embodiments, the service may be notified about the context and/or the canvas and the service may cause the canvas to be automatically created. The service may also populate the newly created canvas with content. The content may be hosted using an in-browser app instance. Different in-browser app instances may be employed to display different types of content. For example, a word processing in-browser app might be employed to display a document, a video in-browser app may be employed to display video content, a spreadsheet in-browser app may be employed to display a spreadsheet, etc.

For example, if the user selects a Word document during the canvas creation operation, a "Word" canvas 230 may be created and an associated Word document may be provided in the workspace 240. Thus, a canvas may provide users with various files that a user may access or otherwise open, or a canvas 230 may be used to provide direct access to a particular file. A document processing in-browser app instance, such as MICROSOFT WORD, may be employed to display document content in the canvas.

Figure 7A:
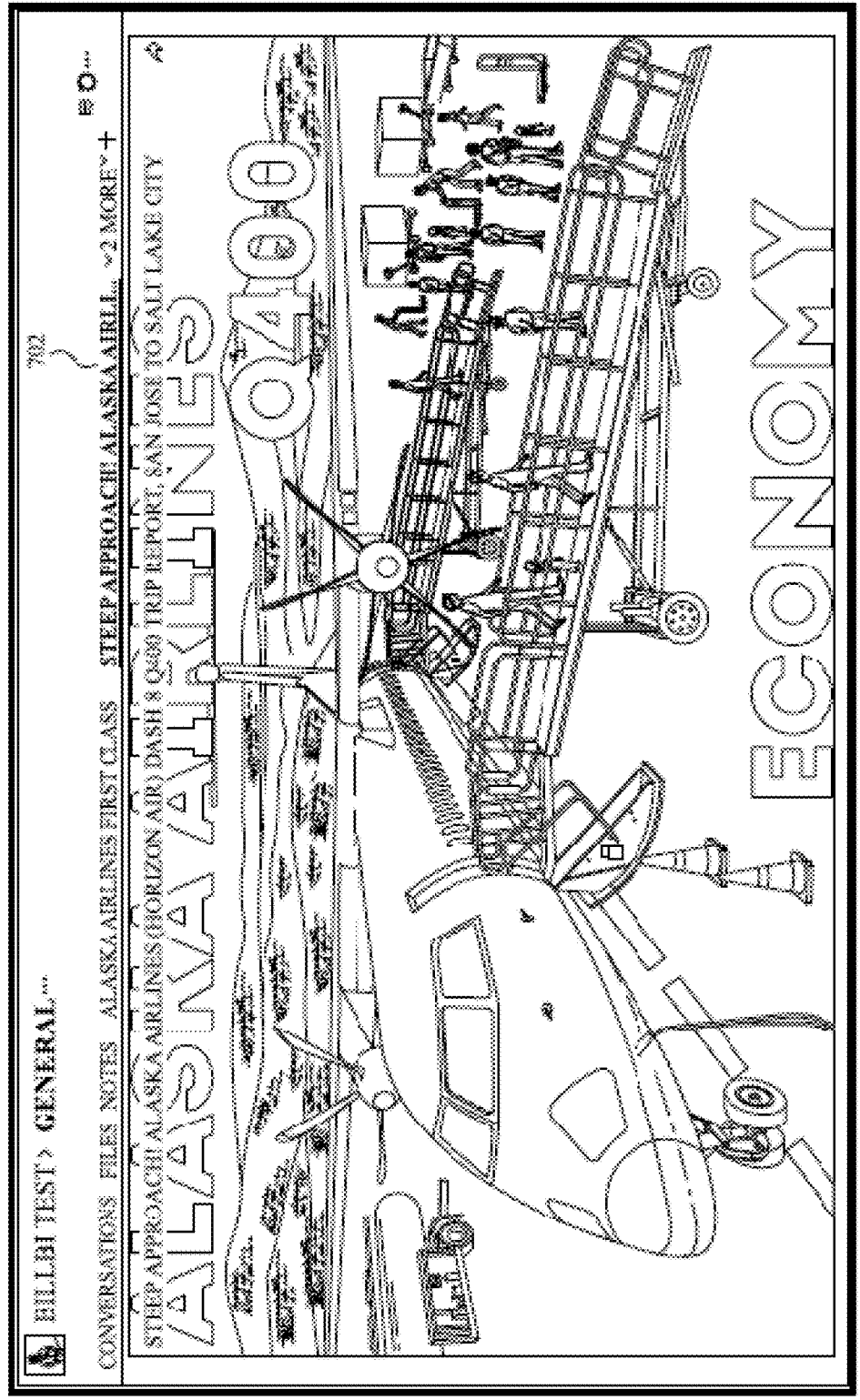
FIG. 7A provides an exemplary user interface displaying a first canvas having first content.
Figure 7B:
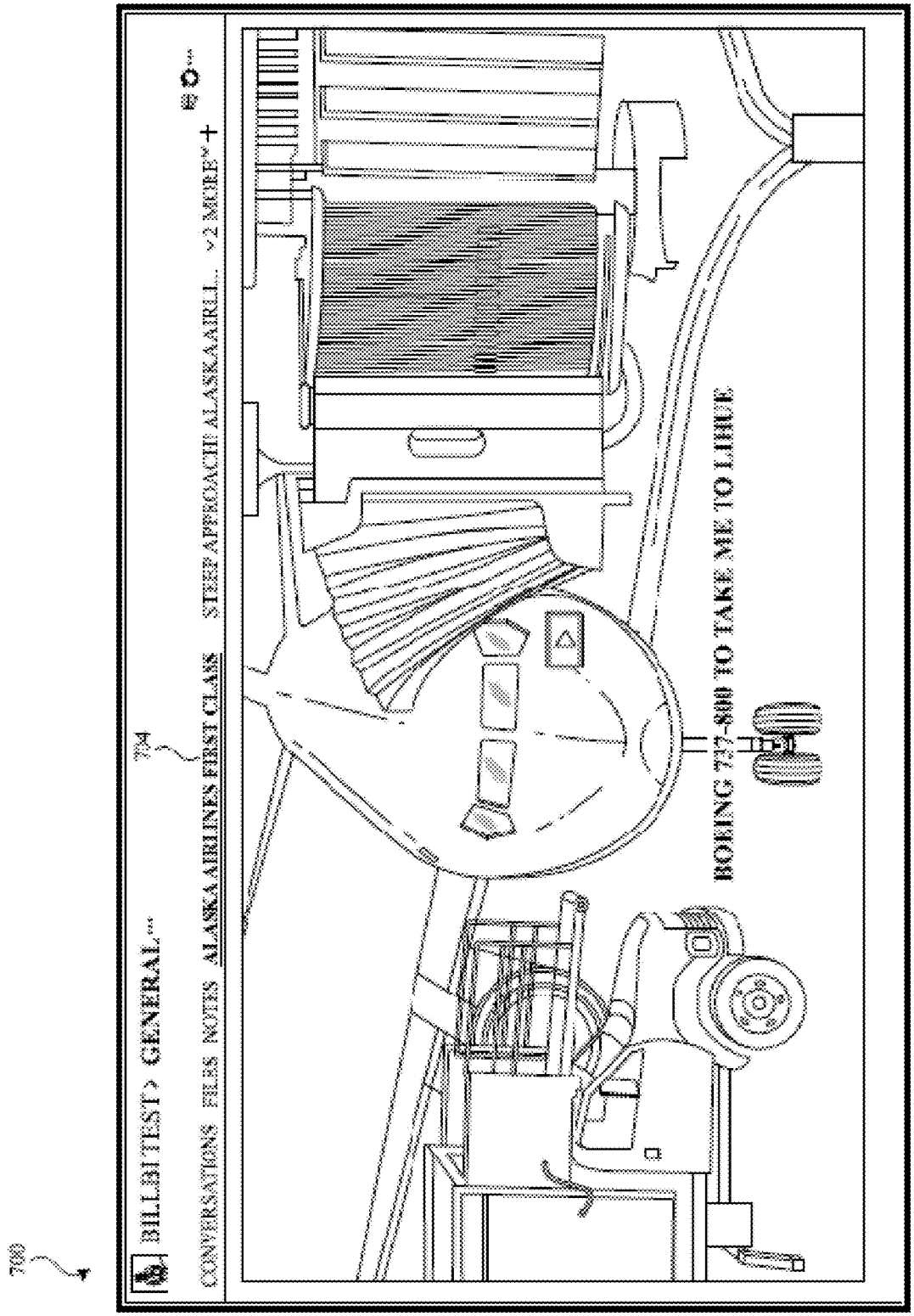
FIG. 7B provides another view of the exemplary user interface displaying a second canvas having second content.

As discussed above, each canvas may be implemented as a separate iframe. Each iframe may execute in individual sandbox runtimes. The different iframes for the different canvas may instantiate an object, such as an in-browser app instance, in order to display embedded content. As such, different canvas displaying the same type of content may instantiate the same type of in-browser app instance in order to display different content having the same type. Upon receiving a context switch, e.g., receiving an instruction to switch from one canvas to another, the context switch may require instantiating a new in-browser app instance for the new canvas. However, instantiating the new in-browser app instance each time a context switch occurs may result in performance issues. As such, performance optimizations may occur by reusing instantiated in-browser app instances that are similar to different canvas and/or contexts. FIG. 7A provides an exemplary user interface 700 displaying a first canvas having first content. In the provided example, the canvas 702 is selected. Canvas 702 hosts video content, namely, the "STEEP APPROACH" video. In the depicted example, an in-browser app instance capable of playing a video file may be used to host the displayed content. FIG. 7B provides another view of the exemplary user interface 700 displaying a second canvas having second content. As illustrated in FIG. 7B, the second canvas 704 is selected. Second canvas 704 hosts video content, namely, the "Alaska Airlines First Class" video. Both canvas 702 and 704 display content having similar content types. As such, a single in-browser application instance may be used to display both content items as opposed to instantiating different in-browser applications for each canvas 702 and 704. As such, a single in-browser application can be re-homed to display the exemplary content for both canvas 702 and canvas 704.

Figure 8:
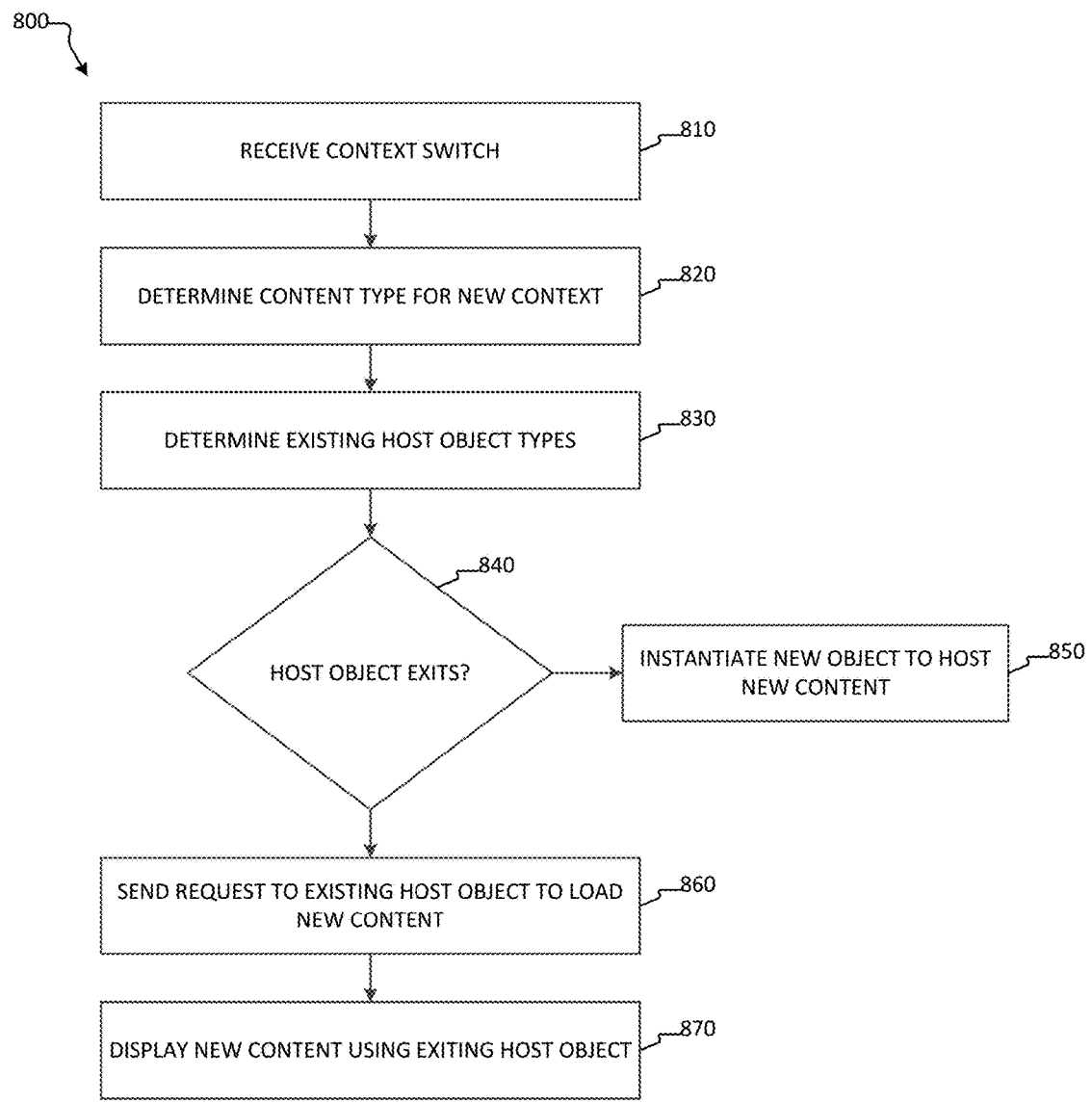
FIG. 8 illustrates a method 800 for re-homing embedded web content via cross-iframe signaling.

FIG. 8 illustrates a method 800 for re-homing embedded web content via cross-iframe signaling. Method 800 begins at operation 810 in which an instruction to switch context is received. An instruction to switch context may include instructions to switch to a different context or canvas. For example, an instruction to switch context may be received upon selection of a different canvas by the user. Upon receiving an instruction to switch context, flow continues to operation 820 where a content type for a new context may be determined. In one example, the type of content for the new context, e.g., the type of content displayed in a new canvas, may be examined to determine a content type for the new context. In alternate example, metadata about the content, about the new context (e.g., canvas metadata) may be examined to determine a content type.

As previously discussed, different types of objects may be employed to host different type of content. In one aspect, different in-browser app instances may be used to display different content type. For example, a word processing in-browser app might be employed to display a document, a video in-browser app may be employed to display video content, a spreadsheet in-browser app may be employed to display a spreadsheet, etc. As such, upon determining a content type, flow continues to operation 830 where existing objects may be analyzed. For example, currently instantiated in-browser app instances may be analyzed in order to determine what type of in-browser app instances are currently executing. Existing host objects may be cached for reuse across different iframe instances. For example, in most browsers, host objects may be cached using Z-order, absolute X/Y coordinates manipulation, or CSS visibility. Flow continues to decision operation 840 where a determination is made as to whether a host object is currently, instantiated for the content type associated with the new context. If a host object for the content type does not exist, flow branches NO to operation 850.

Returning to decision operation 840, if a host object for the new content is currently instantiated, flow branches YES to operation 860. At operation 860, a request is sent to the existing host object to load the new content. In one example, a request may be sent from one frame to a new frame using cross-iframe communication. Operating system or browser APIs may be employed to send a cross-iframe communication. As an example, the Window.postMessage (message, targetOrigin, transfer[ ]) command may be invoked to perform cross-iframe communications. In examples, a request message may comprise RPC-like invocations, such as, for example, loadDocument with a supplied target URL identifying the new content to be loaded. In examples, when a context switch is invoked based upon selection of a new canvas, it may be the responsibility of the canvas application to rehome new content using the provided content identifier received with the request.

Upon sending the request, the new content may be retrieved and displayed using the existing host object at operation 870. As such, the method 800 allows existing host objects to rehome and display new content associated with a new context. This removes the need to invoke a new host object every time a context switch occurs, thereby reducing load times and providing other efficiency optimizations.

FIGS. 9-12 and the associated descriptions provide a discussion of a variety of operating environments in which aspects of the disclosure may be practiced. However, the devices and systems illustrated and discussed with respect to FIGS. 9-12 are for purposes of example and illustration and are not limiting of a vast number of computing device configurations that may be utilized for practicing aspects of the disclosure, described herein.

Figure 9:
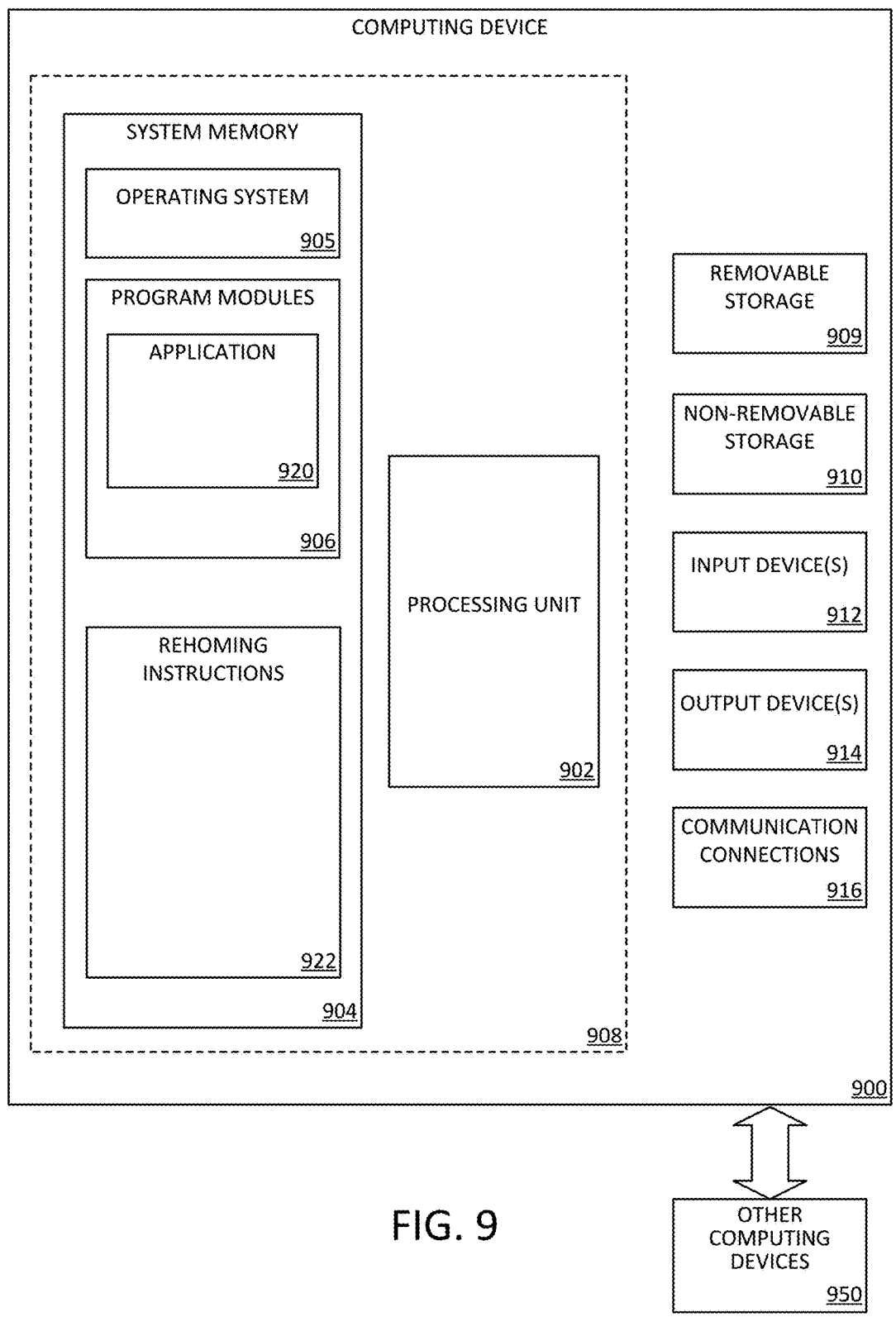
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may be suitable for the computing devices described above, including the client computing devices 110A and 110B and the server computing device 120. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories.

The system memory 904 may include an operating system 905 and one or more program modules 906 suitable for running software application 920, such as one or more components supported by the systems described herein. As examples, system memory 904 may store a collaborative workspace environment 922 and its associated content (e.g., canvases, content, conversations and so on). The operating system 905, for example, may be suitable for controlling the operation of the computing device 900.

Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., application 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
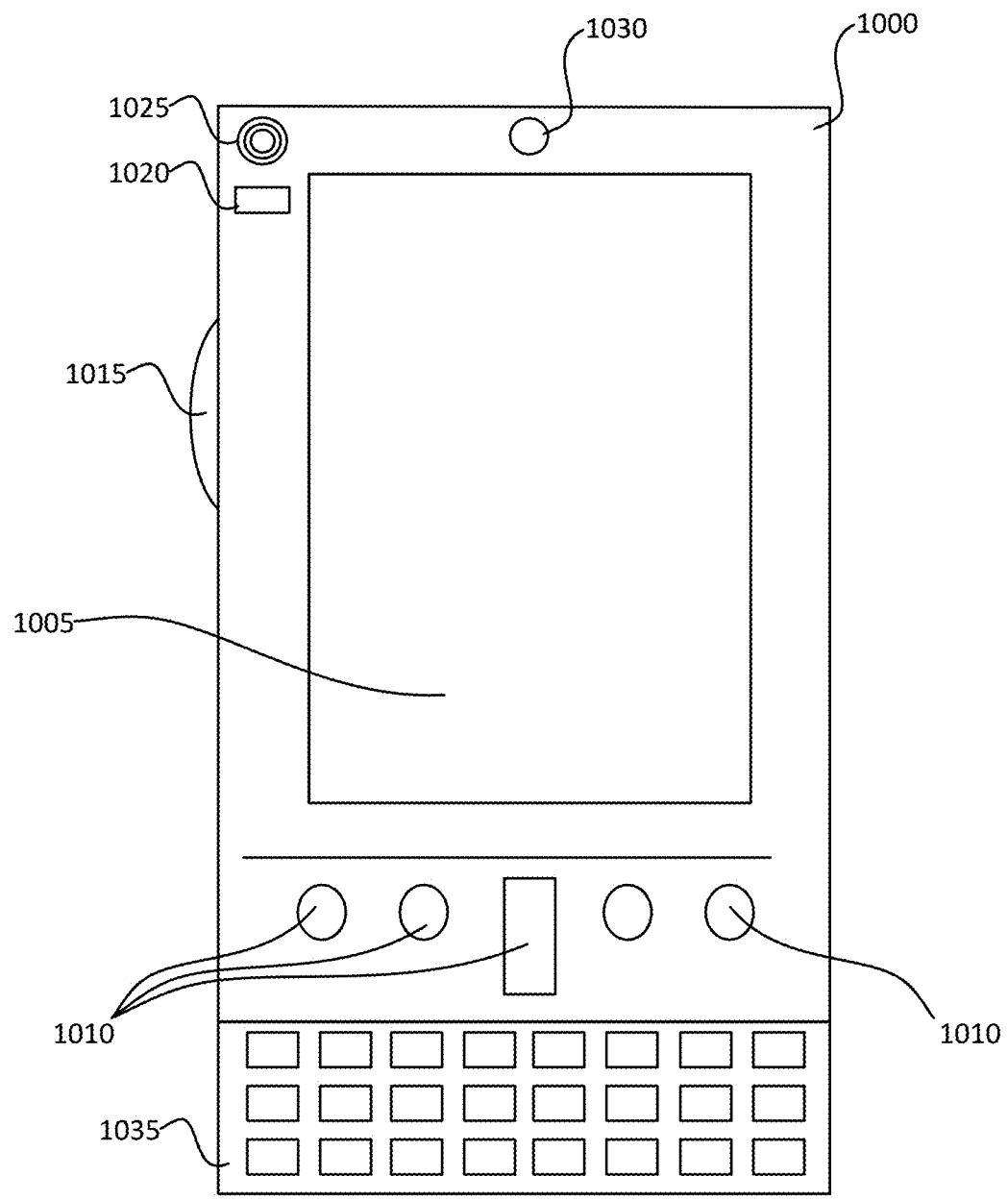
FIGS. 10A and 10B are simplified block diagrams of a mobile computing device with which aspects of the present disclosure may be practiced.
Figure 10B:
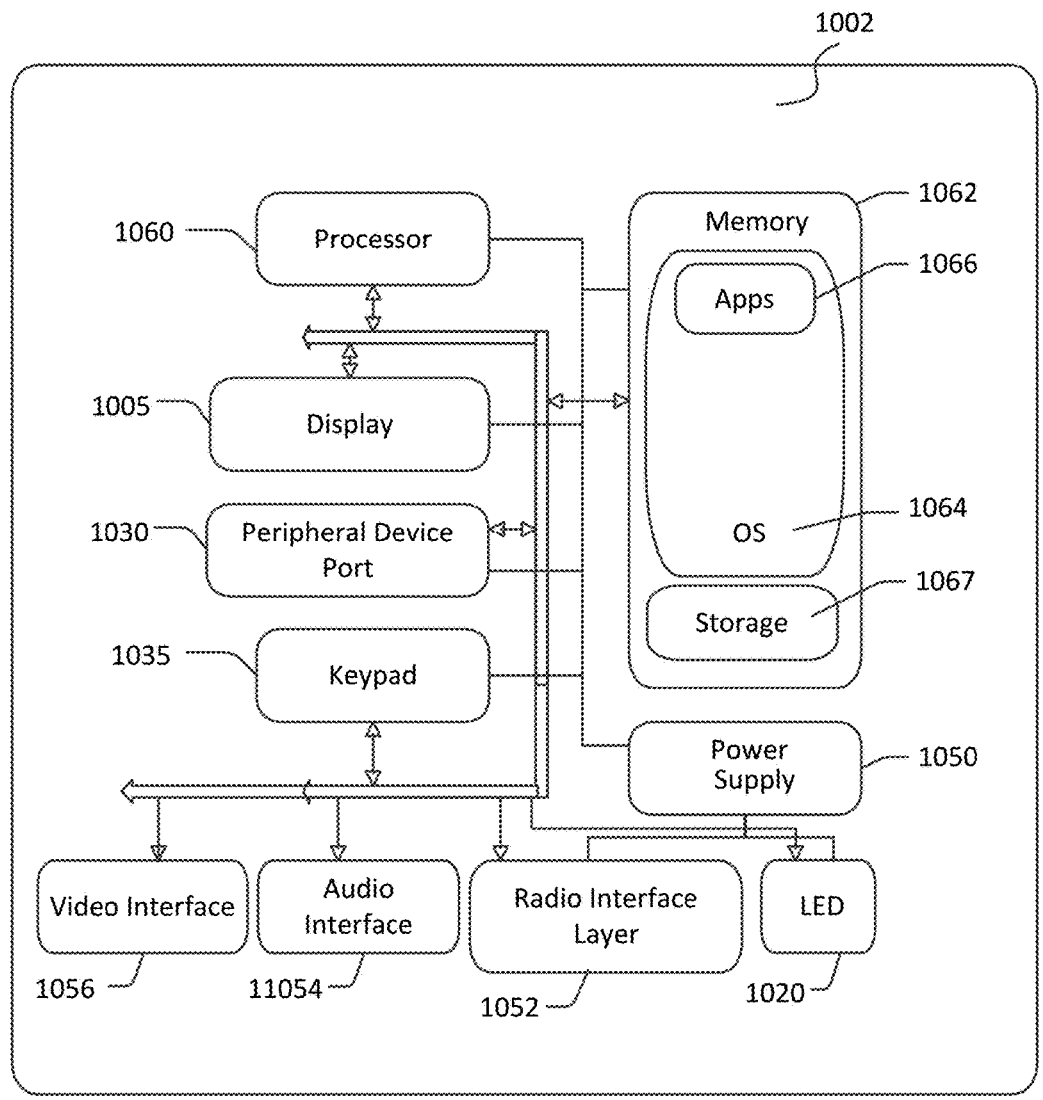

FIGS. 10A and 10B illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display).

If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments.

In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display.

In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
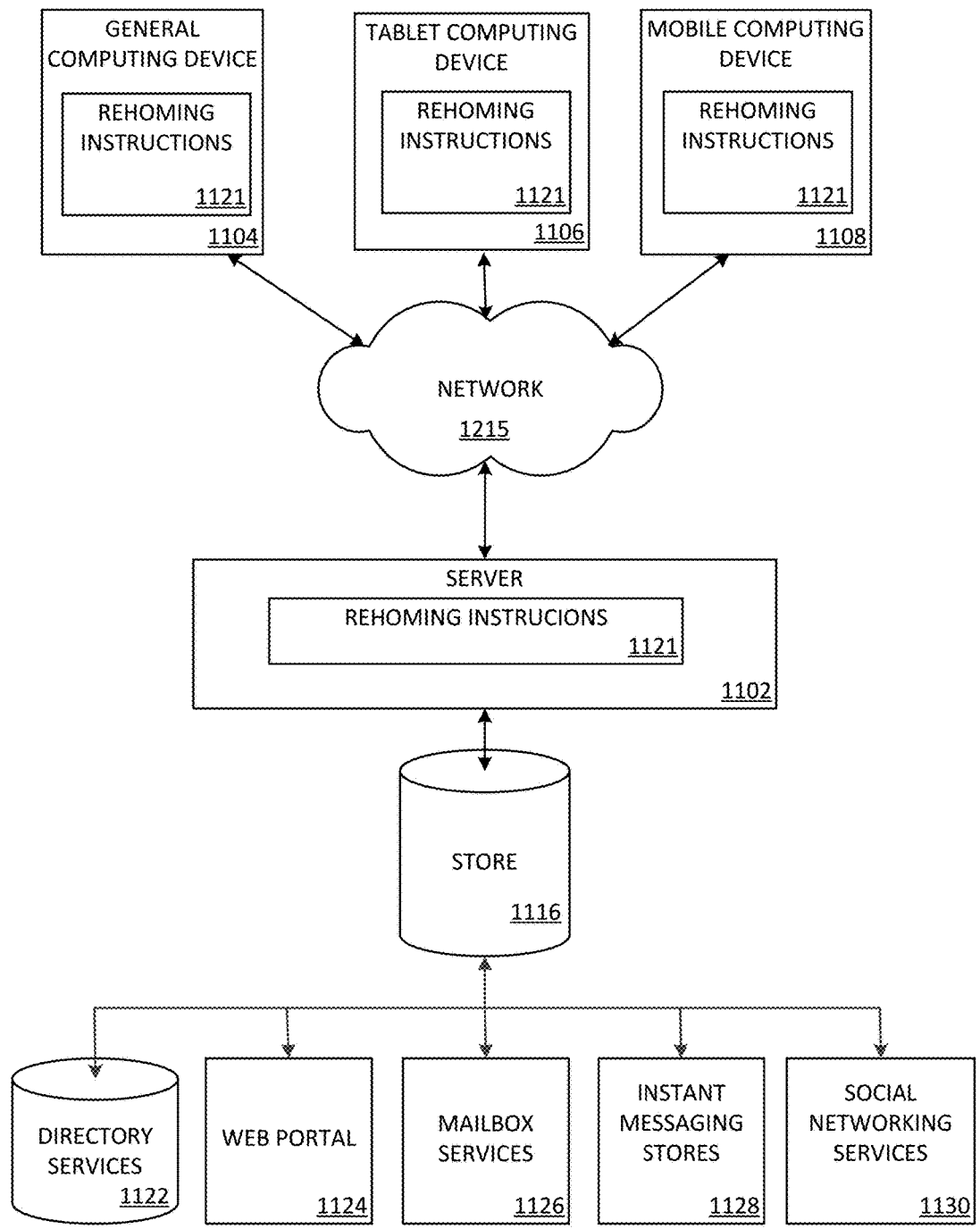
FIG. 11 is a simplified block diagram of a distributed computing system in which aspects of the present disclosure may be practiced.

FIG. 11 illustrates one aspect of the architecture of a system for processing data received at a computing system from a remote source, such as a personal computer 1104, tablet computing device 1106, or mobile computing device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking site 1130.

A collaborative workspace environment 1121 may be employed by a client that communicates with server device 1102, and/or the collaborative workspace environment 1121 may be employed by server device 1102. The server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

Figure 12:
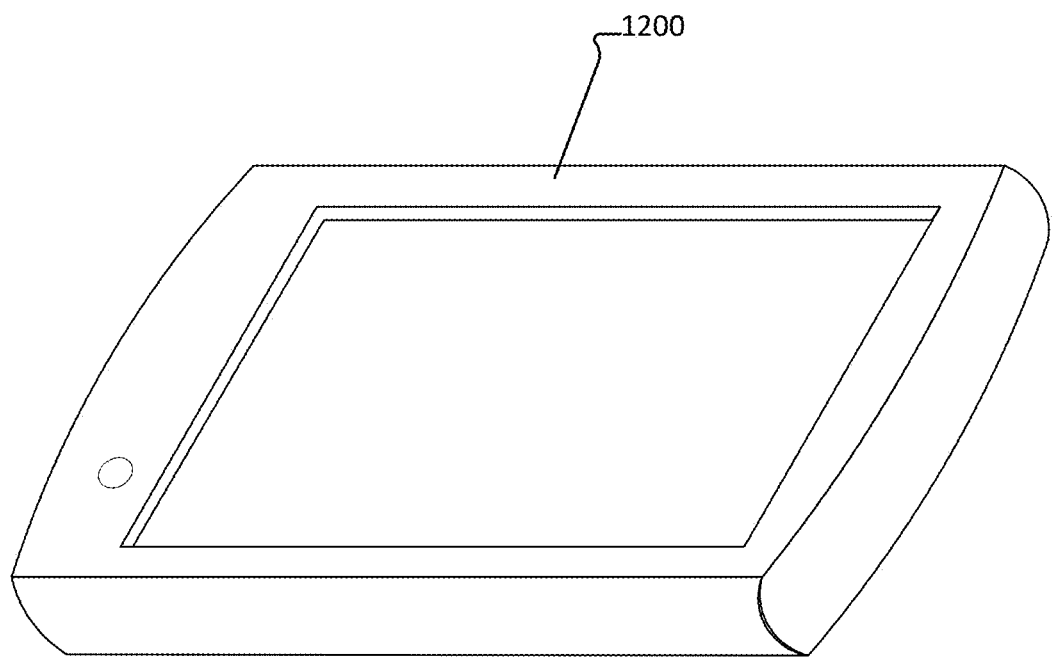
FIG. 12 illustrates a tablet computing device for executing one or more aspects of the present disclosure.

FIG. 12 illustrates an exemplary tablet computing device 1200 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one hardware processing unit; and
   at least one memory storing computer executable instructions which, when executed by the at least one hardware processing unit, cause the at least one hardware processing unit to perform a method comprising:
   displaying a user interface, the user interface including a plurality of canvases and configured to clear a host object configured to display a particular type of content, and re-instantiate the host object when switching between different contexts;
   receiving a context switch selecting a new canvas for display;
   determining a content type for content associated with the new canvas;

determining whether a host object configured to display the content type is currently instantiated; and when a host object configured to display the content type is currently instantiated, sending a request to the host object to display the new content in the new canvas.

2. The system of claim 1, wherein the context switch is received in response to a selection of a new canvas.

3. The system of claim 1, wherein each host object is an object within a separate iframe, and the request is sent via a cross-iframe communication.

4. The system of claim 1, wherein the request comprises a remote procedure call (RPC) invocation and a content identifier.

5. The system of claim 1, wherein the method further comprises when a existing a host object for configured to display the content type is not currently instantiated, instantiating a new host object.

6. The system of claim 5, wherein the user interface uses a document object model (DOM) having a default update operation that clears an iframe and reinstantiates the iframe, the update operation including a context switch.

7. A method for performing a context switch, the method comprising:

displaying a user interface, wherein the user interface comprises a plurality of canvases and configured to clear a host object for displaying a particular type of content and re-instantiate the host object when switching between different contexts;

displaying first content of a first content type in a first canvas of the plurality of canvases using a first host object configured to display content of the first content type;

receiving an instruction to switch from the first canvas to a second canvas, wherein the second canvas comprises second content of a second content type;

and when the first content type and the second content type are the same, sending a request to the first host object to display the second content in the second canvas.

8. The method of claim 7, further comprising, when the first content type and the second content type are not the same:

identifying a second host object configured to display content of the second content type, and displaying the second content in the second canvas using the second host object.

9. The method of claim 7, wherein the host object is an object within an iframe, and the request is sent using cross-iframe communication.

10. The method of claim 7, wherein the request comprises a remote procedure call (RPC) invocation and a content identifier.

11. The method of claim 7, further comprising displaying the second canvas, wherein displaying the second canvas comprises displaying the second object using the first host object.

12. The method of claim 7, further comprising:

receiving an instruction to switch from the second canvas to a third canvas, wherein the third canvas comprises third content;

determining a third content type third content; and comparing the third content type and the second content type.

13. The method of claim 12, further comprising when the second content type and the third content type are the same, sending a second request to the first host object to display the third content in the second canvas.

14. The method of claim 12, further comprising when the second content type and the third content type are not the same:

identifying a second host object, wherein the second host object is identified based at least in part on the third content type;

instantiating the second host object; and displaying the second content in the third canvas using the second host object.

15. A computer storage medium encoding computer executable instructions that, when executed by at least one processor, perform a method comprising:

displaying a user interface, wherein the user interface comprises a plurality of canvases and configured to clear a host object for displaying a particular type of content and re-instantiate the host object when switching between different contexts;

displaying first content of a first type in a first canvas of the plurality of canvases, wherein the first content is displayed using a first host object configured to display content of the first type;

receiving an instruction to switch from the first canvas to a second canvas, wherein the second canvas comprises second content of a second type;

and when the first content type and the second content type are the same, sending a request to the first host object to display the second content in the second canvas.

16. The computer storage medium of claim 15, wherein the method further comprises:

receiving an instruction to switch from the second canvas to a third canvas, wherein the third canvas comprises third content;

determining a third content type third content; and comparing the third content type and the second content type.

17. The computer storage medium of claim 16, wherein the method further comprises, when the second content type and the third content type are the same, sending a second request to the first host object to display the third content in the second canvas.

18. The computer storage medium of claim 16, wherein the method further comprises, when the second content type and the third content type are not the same:

identifying a second host object, wherein the second host object is identified based at least in part on the third content type;

instantiating the second host object; and displaying the second content in the third canvas using the second host object.

19. The computer storage medium of claim 15, wherein each host object is an object within a separate iframe, and the request is sent via a cross-iframe communication.

* * * * *